United States Patent
Feng et al.

(10) Patent No.: US 8,300,508 B2
(45) Date of Patent: Oct. 30, 2012

(54) METHOD AND APPARATUS FOR JUDGING BLANK AREA AND DATA RECORDED-AREA OF OPTICAL DISC

(75) Inventors: Wen-Chun Feng, Hsinchu (TW); Yen-Chien Cheng, Hsinchu (TW); Shao-Lun Hung, Hsinchu (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 214 days.

(21) Appl. No.: 12/890,809

(22) Filed: Sep. 27, 2010

(65) Prior Publication Data

US 2011/0310718 A1   Dec. 22, 2011

(30) Foreign Application Priority Data

Jun. 22, 2010  (TW) .............................. 99120259 A

(51) Int. Cl.
*G11B 20/18* (2006.01)

(52) U.S. Cl. ................................. 369/53.24

(58) Field of Classification Search .............. 369/53.2, 369/53.24
See application file for complete search history.

(56) References Cited

U.S. PATENT DOCUMENTS

| | | | | |
|---|---|---|---|---|
| 5,128,920 A * | 7/1992 | Yamamuro | .................. | 369/47.5 |
| 6,556,525 B1 * | 4/2003 | Takiguchi | .................. | 369/53.24 |
| 6,728,180 B1 * | 4/2004 | Park | .......................... | 369/53.11 |
| 2003/0152000 A1 * | 8/2003 | Yamanoi et al. | ............ | 369/53.22 |
| 2004/0057365 A1 * | 3/2004 | Chen et al. | .................. | 369/53.24 |
| 2004/0223437 A1 * | 11/2004 | Shiono | ........................ | 369/53.22 |
| 2004/0246846 A1 * | 12/2004 | Takahashi et al. | ........... | 369/53.2 |
| 2007/0091754 A1 * | 4/2007 | Ishikawa | .................... | 369/53.22 |
| 2009/0092021 A1 * | 4/2009 | Chang et al. | ................ | 369/53.24 |
| 2010/0027396 A1 * | 2/2010 | Minamino | .................. | 369/53.12 |

* cited by examiner

*Primary Examiner* — Wayne Young
*Assistant Examiner* — Brenda Bernardi
(74) *Attorney, Agent, or Firm* — WPAT PC; Justin King

(57) ABSTRACT

An apparatus for judging an optical disc includes a gain controller, an amplitude detecting unit and an amplitude comparing unit. The gain controller is used for receiving a radio frequency signal from an optical pickup head; and processing the radio frequency signal into an amplified radio frequency signal with a target amplitude according to an amplitude feedback signal. The amplitude detecting unit is used for receiving the amplified radio frequency signal, generating the amplitude feedback signal to the gain controller, and outputting a top envelope amplitude according to an top envelope signal of the amplified radio frequency signal. The amplitude comparing unit is used for comparing the top envelope amplitude with a threshold value to generate a resulting signal, and judging whether the laser beams emitted from the optical pickup head are irradiated on a blank area or a data-recorded area according to the resulting signal.

10 Claims, 5 Drawing Sheets

METHOD AND APPARATUS FOR JUDGING BLANK AREA AND DATA RECORDED-AREA OF OPTICAL DISC

CROSS-REFERENCE TO RELATED APPLICATION

This application claims the priority benefit of Taiwan application serial no. 099120259, filed on Jun. 22, 2010. The entirety of the above-mentioned patent application is incorporated herein by reference and made a part of this specification.

BACKGROUND

1. Technical Field

The present invention relates to a method and an apparatus for judging an optical disc, and more particularly to a method and an apparatus for judging a blank area and a data-recorded area of an optical disc.

2. Description of the Related Art

As is known to all, the reflectivity of a CD disc or a DVD disc is relatively higher if no data are recorded in the data track. Whereas, if data are recorded in the data track, the reflectivity of the CD disc or the DVD disc decreases. The optical disc having a lower reflectivity in its recorded portion (i.e. a data-recorded area) than in its unrecorded portion (i.e. a blank area) is also referred as a HTL (High to Low) disc. Most of the existing blue ray discs are HTL discs.

On the other hand, some of the blue ray discs are not HTL discs. That is, the reflectivity of such disc is relatively lower if no data are recorded in the data track; whereas, the reflectivity increases if data are recorded in the data track. The optical disc having a higher reflectivity in its recorded portion (i.e. a data-recorded area) than in its unrecorded portion (i.e. a blank area) is also referred as a LTH (Low to High) disc.

Generally, after an optical disc is loaded in a read-only optical disc drive, a focusing-on operation is performed. After the focusing-on operation is performed and before a tracking-on operation is performed, it is necessary to judge whether the laser beams emitted from the optical pickup head are irradiated on the data-recorded area of the optical disc or not. Once the laser beams emitted from the optical pickup head are irradiated on the data-recorded area, the tracking-on operation can be performed. Whereas, if the laser beams emitted from the optical pickup head are irradiated on the blank area of the optical disc, a tracking failure problem occurs.

FIGS. 1A and 1B are schematic timing waveform diagrams illustrating the radio frequency signals obtained from a blank area and a data-recorded area of a conventional HTL disc, respectively. As shown in FIG. 1A, after a HTL disc is loaded in the optical disc drive and a focusing-on operation is performed and before a tracking-on operation is performed, an optical pickup head of the optical disc drive is moved while irradiating the laser beams on the blank area of the HTL disc. As such, a radio frequency signal RF similar to a ripple is obtained. In this situation, the peak to peak value of the radio frequency signal RF is Vpp1. Whereas, as shown in FIG. 1B, if the laser beams emitted from the optical pickup head are irradiated on the data-recorded area of the HTL disc, a radio frequency signal RF having higher frequency is obtained by moving the optical pickup head. In this situation, the peak to peak value of the radio frequency signal RF is Vpp2.

Obviously, the peak to peak value Vpp1 for the blank area is lower than the peak to peak value Vpp2 for the data-recorded area. In other words, the radio frequency signal RF may be compared with a slicing level in order to judge whether the laser beams emitted from the optical pickup head are irradiated on the blank area or the data-recorded area.

The above judging method, however, still has some drawbacks. For example, in a case that the optical disc is a rewritable disc (e.g. RW disc) with low reflectivity change or the intensity of the laser beams emitted from the optical pickup head are too low, an erroneous judgment problem possibly occurs. FIGS. 1C and 1D are schematic timing waveform diagrams illustrating the radio frequency signals obtained from a blank area and a data-recorded area of a conventional low reflectivity HTL disc, respectively. Since the reflectivity difference between the blank area and the data-recorded area is very small, the peak to peak value Vpp3 of the radio frequency signal RF for the blank area and the peak to peak value Vpp4 of the radio frequency signal RF for the data-recorded area are not considerably distinguished. In other words, it is difficult to determine the slicing level, and thus the erroneous judgment problem is readily generated.

Moreover, another method for judging the blank area and the data-recorded area according to a bottom envelop signal is disclosed. FIGS. 2A and 2B are schematic timing waveform diagrams illustrating the radio frequency signals and the bottom envelop signals obtained from a blank area and a data-recorded area of a conventional HTL disc, respectively. Obviously, as shown in FIG. 2A, if the laser beams emitted from the optical pickup head are irradiated on the blank area of the optical disc, the bottom envelop signal BES is identical to the radio frequency signal RF because the frequency of the radio frequency signal RF is relatively lower. In this situation, the amplitude of the radio frequency signal RF is Va1. Whereas, as shown in FIG. 2B, if the laser beams emitted from the optical pickup head are irradiated on the data-recorded area of the optical disc, the amplitude of the bottom envelop signal BES is Va2.

Obviously, the amplitude Va1 of the bottom envelop signal BES for the blank area is lower than the amplitude Va2 of the bottom envelop signal BES for the data-recorded area. As a consequence, the use of a threshold value may judge whether the laser beams emitted from the optical pickup head are irradiated on the blank area or the data-recorded area.

Similarly, in a case that the optical disc is a rewritable disc (e.g. RW disc) with low reflectivity change or the intensity of the laser beams emitted from the optical pickup head are too low, the erroneous judgment problem possibly occurs. FIGS. 2C and 2D are schematic timing waveform diagrams illustrating the radio frequency signals and the bottom envelop signals obtained from a blank area and a data-recorded area of a conventional low reflectivity HTL disc, respectively. Since the reflectivity difference between the blank area and the data-recorded area is very small, the amplitude Va3 of the bottom envelop signal BES for the blank area and the amplitude Va4 of the bottom envelop signal BES for the data-recorded area are not considerably distinguished from each other. In other words, since it is difficult to determine the threshold value, the erroneous judgment problem is readily generated.

The above two methods are illustrated by referring to the HTL disc. Nevertheless, due to the small reflectivity difference between the blank area and the data-recorded area of the LTH disc, the amplitude of the radio frequency signal or the bottom envelop signal is still too low. In this situation, the erroneous judgment problem possibly occurs.

Another method for judging a blank area and a data-recorded area of an optical disc is disclosed in for example Taiwanese Patent Publication No. 1317944, which is entitled "Method for identifying recording contents of an optical disk". In this method, a radio frequency signal is processed by a low pass filter to generate a filtered radio frequency signal. According to the level of the filtered radio frequency signal, this method may judge whether the laser beams emitted from the optical pickup head are irradiated on the blank area or the data-recorded area. However, this method is illustrated by referring a HTL disc. That is, this method is not suitable to judge the LTH disc.

BRIEF SUMMARY

The present invention provides a method and an apparatus for judging a blank area and a data-recorded area of an optical disc. Regardless of whether the optical disc is a HTL (High to Low) disc or a LTH (Low to High) disc, the same method can be used to judge a blank area and a data-recorded area of the optical disc. As such, the influence of the reflectivity change of the optical disc or the inconsistent laser intensity is not necessarily taken into consideration.

In accordance with an aspect, the present invention provides an apparatus for judging an optical disc in an optical disc drive. The apparatus includes a gain controller, an amplitude detecting unit and an amplitude comparing unit. The gain controller is used for receiving a radio frequency signal from an optical pickup head, and processing the radio frequency signal into an amplified radio frequency signal with a target amplitude according to an amplitude feedback signal. The amplitude detecting unit is used for receiving the amplified radio frequency signal, generating the amplitude feedback signal to the gain controller, and outputting a top envelope amplitude according to an top envelope signal of the amplified radio frequency signal. The amplitude comparing unit is used for comparing the top envelope amplitude with a threshold value to generate a resulting signal, and judging whether the laser beams emitted from the optical pickup head are irradiated on a blank area or a data-recorded area of the optical disc according to the resulting signal.

In accordance with another aspect, the present invention provides a method for judging an optical disc in an optical disc drive. The method includes the following steps. Firstly, a radio frequency signal from an optical pickup head is received. Then, the radio frequency signal is processed into an amplified radio frequency signal with a target amplitude. Then, an top envelope signal is obtained according to the amplified radio frequency signal, wherein the top envelope signal has a top envelope amplitude. If the top envelope amplitude is greater than a threshold value, it is determined that the laser beams emitted from the optical pickup head are irradiated on a blank area of the optical disc. Whereas, if the top envelope amplitude is smaller than the threshold value, it is determined that determining that the laser beams emitted from the optical pickup head are irradiated on a data-recorded area of the optical disc.

Other objectives, features and advantages of the present invention will be further understood from the further technological features disclosed by the embodiments of the present invention wherein there are shown and described preferred embodiments of this invention, simply by way of illustration of modes best suited to carry out the invention.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

In accordance with the present invention, when a radio frequency signal RF is received by a controlling circuit of an optical disc drive, the radio frequency signal RF is processed into an amplified radio frequency signal RF_gc with a target amplitude Vtarget by a gain controller. Then, a top envelope signal of the amplified radio frequency signal RF_gc is obtained. The top envelope signal is an index for judging whether the laser beams emitted from an optical pickup head are irradiated on a blank area or a data-recorded area of an optical disc.

Figure 1A:
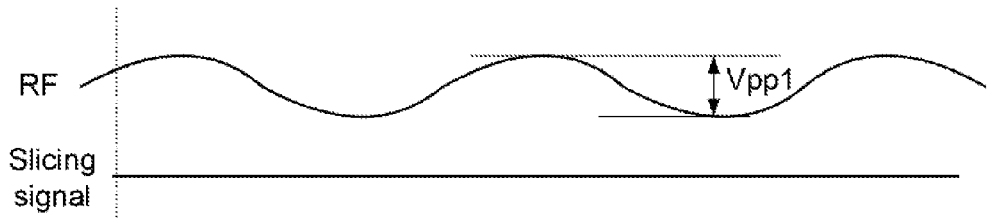
FIGS. 1A and 1B are schematic timing waveform diagrams illustrating the radio frequency signals obtained from a blank area and a data-recorded area of a conventional HTL disc, respectively.
Figure 1B:
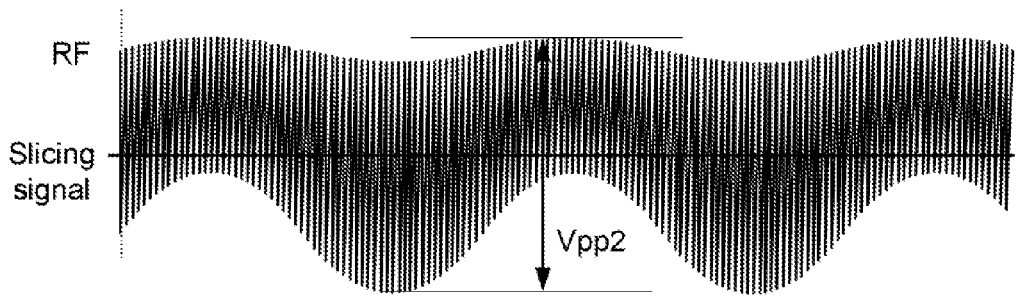
Figure 1C:
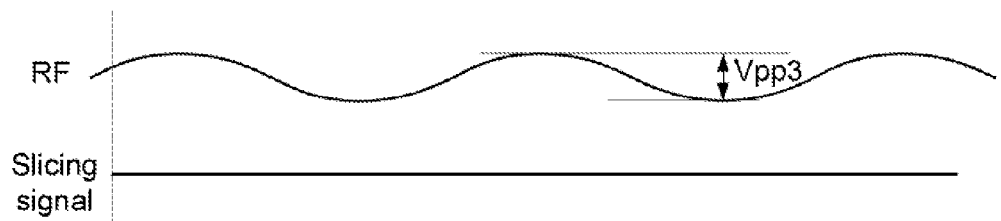
FIGS. 1C and 1D are schematic timing waveform diagrams illustrating the radio frequency signals obtained from a blank area and a data-recorded area of a conventional low reflectivity HTL disc, respectively.
Figure 1D:
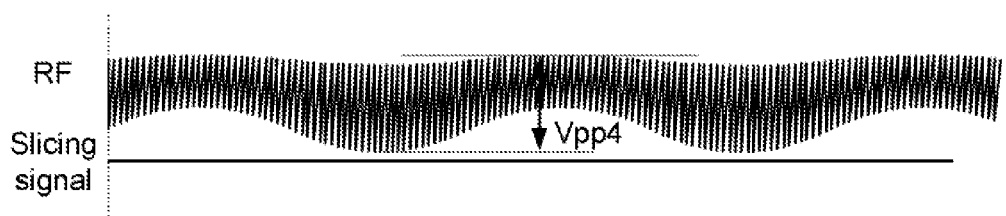
Figure 2A:
FIGS. 2A and 2B are schematic timing waveform diagrams illustrating the radio frequency signals and the bottom envelop signals obtained from a blank area and a data-recorded area of a conventional HTL disc, respectively.
Figure 2B:
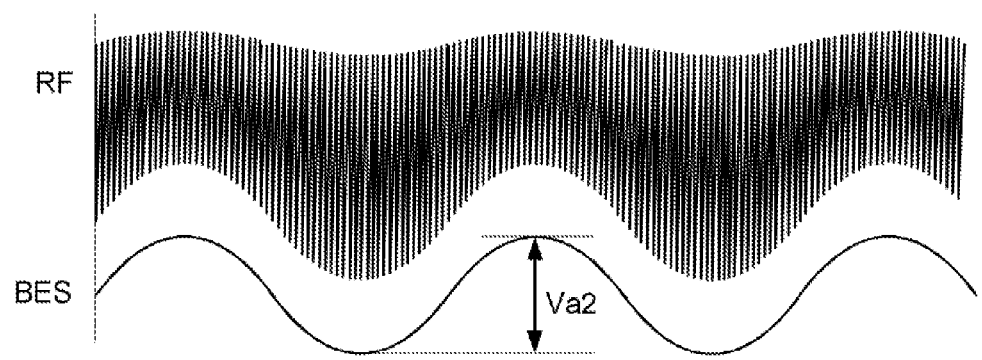
Figure 2C:
FIGS. 2C and 2D are schematic timing waveform diagrams illustrating the radio frequency signals and the bottom envelop signals obtained from a blank area and a data-recorded area of a conventional low reflectivity HTL disc, respectively.
Figure 2D:
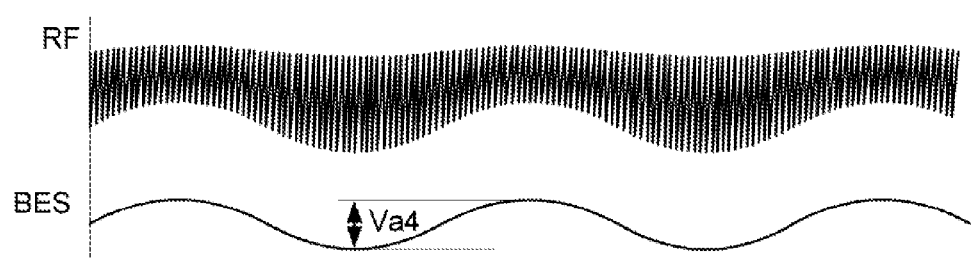
Figure 3:
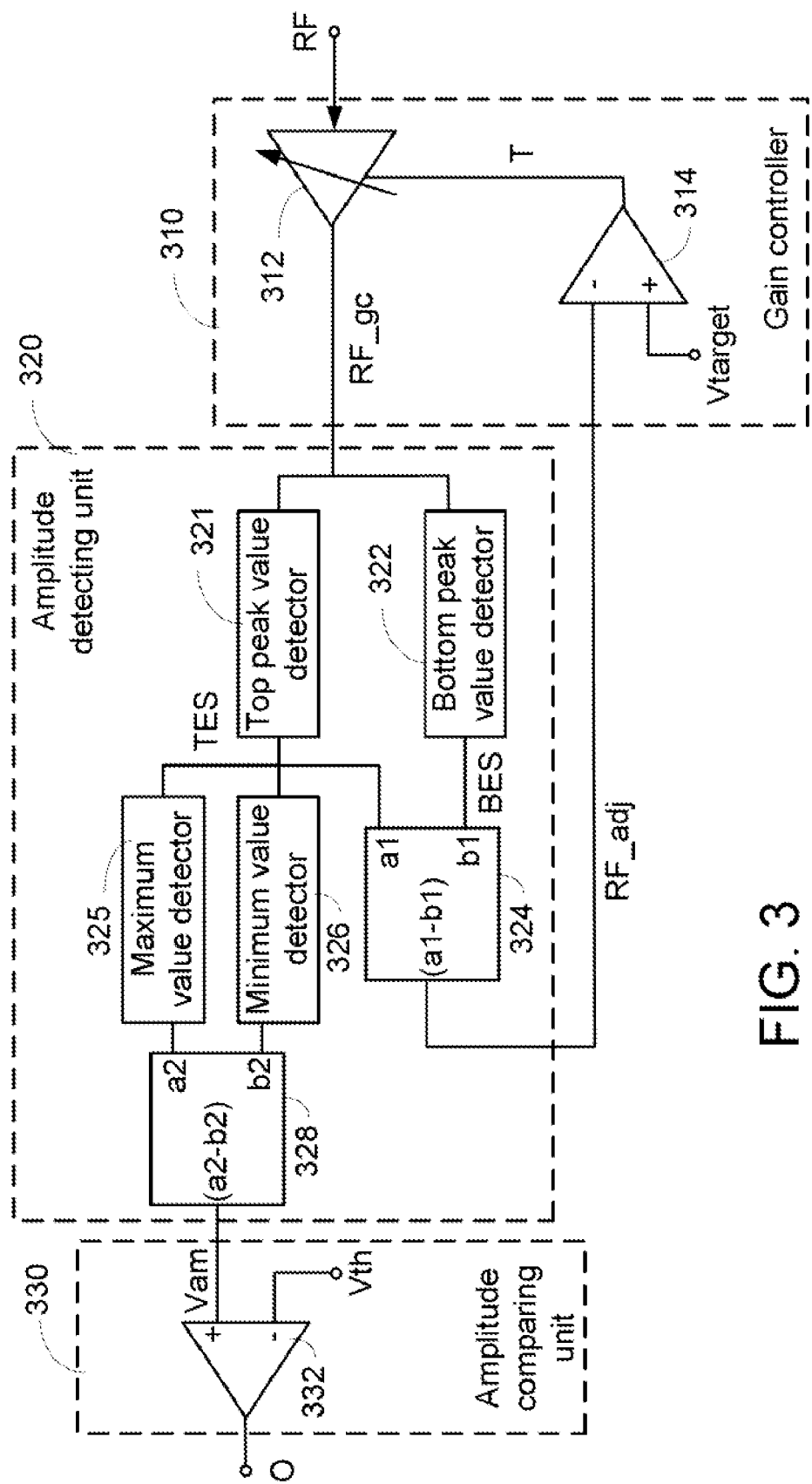
FIG. 3 is a schematic circuit block diagram illustrating an apparatus for judging a blank area and a data-recorded area of an optical disc.

FIG. 3 is a schematic circuit block diagram illustrating an apparatus for judging a blank area and a data-recorded area of an optical disc. As shown in FIG. 3, the apparatus comprises a gain controller 310, an amplitude detecting unit 320 and an amplitude comparing unit 330.

The gain controller 310 receives a radio frequency signal RF that is generated by an optical pickup head (not shown). According to an amplitude feedback signal RF_adj, the radio frequency signal RF is processed into an amplified radio frequency signal RF_gc by the gain controller 310. In addition, the amplified radio frequency signal RF_gc has a target amplitude Vtarget.

The amplitude detecting unit 320 is used for receiving the amplified radio frequency signal RF_gc, and generating the amplitude feedback signal RF_adj. Moreover, if the amplified radio frequency signal RF_gc has the target amplitude Vtarget, a top envelope signal TES of the amplified radio frequency signal RF_gc is sampled by the amplitude detecting unit 320, and thus a top envelope amplitude Vam is acquired. Then, the amplitude comparing unit 330 compares the top envelope amplitude Vam with a threshold value Vth, thereby judging whether the laser beams emitted from the optical pickup head are irradiated on the blank area or the data-recorded area.

Please refer to FIG. 3 again. The gain controller 310 comprises an adjustable amplifier 312 and a first comparator 314. By the first comparator 314, the amplitude feedback signal RF_adj is compared with the target amplitude Vtarget, and an adjusting signal T is issued to a control terminal of the adjustable amplifier 312. According to the adjusting signal T, the received radio frequency signal RF is amplified by the adjustable amplifier 312 to the amplified radio frequency signal RF_gc with the target amplitude Vtarget.

The amplitude detecting unit 320 comprises a top peak value detector 321, a bottom peak value detector 322, a first subtractor 324, a maximum value detector 325, a minimum value detector 326 and a second subtractor 328. The top peak value detector 321 receives the amplified radio frequency signal RF_gc, and generates the top envelope signal TES of the amplified radio frequency signal RF_gc. The bottom peak value detector 322 receives the amplified radio frequency signal RF_gc, and generates a bottom envelope signal BES of the amplified radio frequency signal RF_gc. In addition, the first subtractor 324 has a first input end (a1) receiving the top envelope signal TES and a second input end (b1) receiving the bottom envelope signal BES. As such, the amplitude feedback signal RF_adj is outputted from an output end (a1-b1) of the first subtractor 324. In practice, the amplitude feedback signal RF_adj has the actual amplitude of the amplified radio frequency signal RF_gc. The amplitude feedback signal RF_adj is inputted into the first comparator 314 of the gain controller 310. By comparing the amplitude feedback signal RF_adj with the target amplitude Vtarget, the adjusting signal T is generated. According to the adjusting signal T, the amplitude of the radio frequency signal RF is adjusted to the target amplitude Vtarget.

The maximum value detector 325 receives the top envelope signal TES, and obtains the maximum value of the top envelope signal TES. The minimum value detector 326 receives the top envelope signal TES, and obtains the minimum value of the top envelope signal TES. In addition, the second subtractor 328 has a first input terminal (a2) receiving the maximum value of the top envelope signal TES and a second input terminal (b2) receiving the minimum value of the top envelope signal TES. As such, the top envelope amplitude Vam is outputted from an output end (a2-b2) of the second subtractor 328.

The amplitude comparing unit 330 comprises a second comparator 332 for receiving the top envelope amplitude Vam. By comparing the top envelope amplitude Vam with the threshold value Vth, the second comparator 332 generates a resulting signal O. In accordance with an embodiment of the present invention, if the resulting signal O is in a high-level state, i.e. the top envelope amplitude Vam is greater than the threshold value Vth, it is indicated that the laser beams emitted from the optical pickup head are irradiated on the blank area. Whereas, if the resulting signal O is in a low-level state, i.e. the top envelope amplitude Vam is smaller than the threshold value Vth, it is indicated that the laser beams emitted from the optical pickup head are irradiated on the data-recorded area.

Figure 4A:
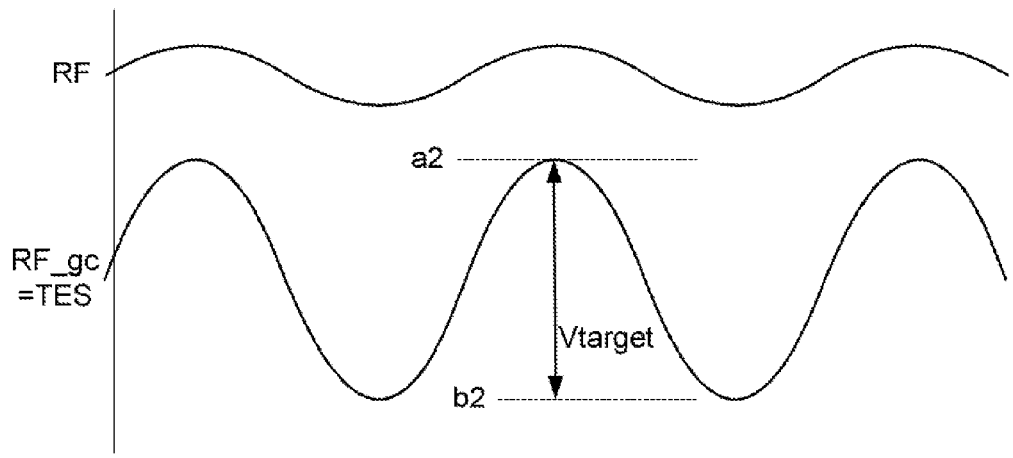
FIG. 4A is a schematic timing waveform diagram illustrating associated signals obtained from the blank area of the optical area.

FIG. 4A is a schematic timing waveform diagram illustrating associated signals obtained from the blank area of the optical area. Since the laser beams emitted from the optical pickup head are irradiated on the blank area, a radio frequency signal RF similar to a ripple is obtained by moving the optical pickup head. Meanwhile, regardless of whether the amplitude of the radio frequency signal RF, the gain value of the gain controller 310 is changed and the amplified radio frequency signal RF_gc is outputted from the gain controller 310. In this situation, the amplitude of the amplified radio frequency signal RF_gc is adjusted to the target amplitude Vtarget.

Since the frequency of the radio frequency signal RF and the frequency of the amplified radio frequency signal RF_gc are both low, the amplified radio frequency signal RF_gc is equal to the top envelope signal TES of the amplified radio frequency signal RF_gc. That is, the top envelope amplitude Vam outputted from the amplitude detecting unit 320 is equal to the target amplitude Vtarget.

Figure 4B:
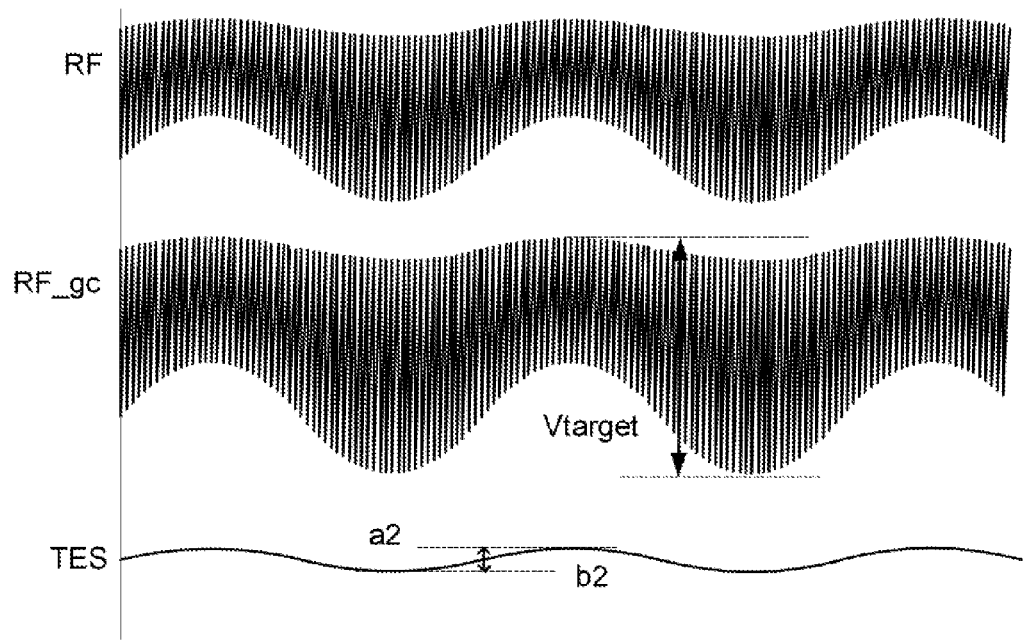
FIG. 4B is a schematic timing waveform diagram illustrating associated signals obtained from the data-recorded area of the optical area.

FIG. 4B is a schematic timing waveform diagram illustrating associated signals obtained from the data-recorded area of the optical area. Since the laser beams emitted from the optical pickup head are irradiated on the data-recorded area, a radio frequency signal RF having higher frequency is obtained by moving the optical pickup head. Meanwhile, the gain value of the gain controller 310 is changed and the amplified radio frequency signal RF_gc is outputted from the gain controller 310. In this situation, the amplitude of the amplified radio frequency signal RF_gc is adjusted to the target amplitude Vtarget. Then, according to the amplified radio frequency signal RF_gc, the amplitude detecting unit 320 generates the top envelope signal TES, and the top envelope amplitude Vam is obtained.

Obviously, since the radio frequency signal RF is processed into an amplified radio frequency signal RF_gc with the target amplitude Vtarget by the gain controller 310, the problem resulting from the reflectivity change of the optical disc or the inconsistent laser intensity will be eliminated.

Moreover, since the top envelope amplitude for the blank area is much greater than the envelope amplitude for the data-recorded area, it is easily to set the threshold value Vth and the possibility of causing the erroneous judgment problem is largely reduced. For example, the threshold value Vth may be set to a half of the target amplitude Vtarget.

Figure 5:
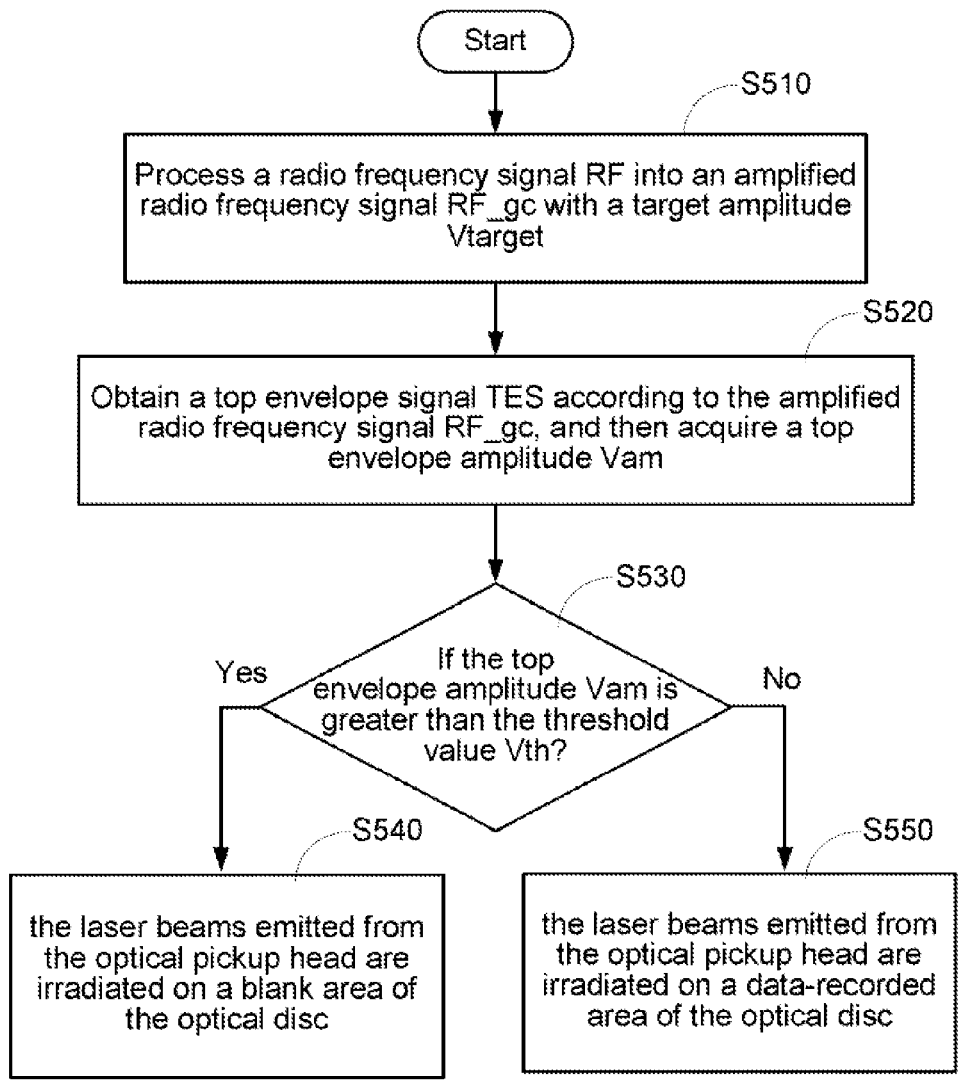
FIG. 5 is a flowchart illustrating a method for judging a blank area and a data-recorded area of an optical disc according to an embodiment of the present invention.

FIG. 5 is a flowchart illustrating a method for judging a blank area and a data-recorded area of an optical disc according to an embodiment of the present invention. First of all, in the step S510, a radio frequency signal RF is processed into an amplified radio frequency signal RF_gc with a target amplitude Vtarget. In the step S520, according to the amplified radio frequency signal RF_gc, a top envelope signal TES is obtained and then a top envelope amplitude Vam is acquired. In the step S530, the top envelope amplitude Vain is compared with a threshold value Vth. If the top envelope amplitude Vam is greater than the threshold value Vth, it is determined that the laser beams emitted from the optical pickup head are irradiated on a blank area of the optical disc (in the step S540). Whereas, if the top envelope amplitude Vain is smaller than the threshold value Vth, it is determined that the laser beams emitted from the optical pickup head are irradiated on a data-recorded area of the optical disc (in the step S550).

From the above description, the method and the apparatus of the present invention are capable of judging a blank area and a data-recorded area of an optical disc in order to obviate the drawback encountered from the prior art. That is, since the adverse influence of the reflectivity change of the optical disc or the inconsistent laser intensity is eliminated, the possibility of causing the erroneous judgment problem is minimized. In addition, the HTL disc and the LTH disc are also applied to the present invention. After the optical disc is loaded in the optical disc drive, regardless of whether the optical disc is a HTL disc or a LTH disc, the method and the apparatus of the present invention can easily judge whether the laser beams emitted from the optical pickup head are irradiated on the blank area or the data-recorded area of the optical disc.

The above description is given by way of example, and not limitation. Given the above disclosure, one skilled in the art could devise variations that are within the scope and spirit of the invention disclosed herein, including configurations ways of the recessed portions and materials and/or designs of the attaching structures. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. An apparatus for judging an optical disc in an optical disc drive, the apparatus comprising:
    a gain controller, for receiving a radio frequency signal from an optical pickup head, and processing the radio frequency signal into an amplified radio frequency signal with a target amplitude according to an amplitude feedback signal;
    an amplitude detecting unit for receiving the amplified radio frequency signal, generating the amplitude feedback signal to the gain controller, and outputting a top envelope amplitude according to a top envelope signal from the amplified radio frequency signal; and
    an amplitude comparing unit for comparing the top envelope amplitude with a threshold value to generate a resulting signal, and judging whether the laser beams emitted from the optical pickup head are irradiated on a blank area or a data-recorded area of the optical disc according to the resulting signal.

2. The apparatus according to claim 1 wherein when the top envelope amplitude Vam is greater than the threshold value, the resulting signal is in a first level state to indicate that the laser beams emitted from the optical pickup head are irradiated on the blank area of the optical disc, otherwise, when the top envelope amplitude Vam is smaller than the threshold value, the resulting signal is in a second level state to indicate that the laser beams emitted from the optical pickup head are irradiated on the data-recorded area of the optical disc.

3. The apparatus according to claim 1 wherein the gain controller comprises:
    an adjustable amplifier, for receiving the radio frequency signal, and processing the radio frequency signal into the amplified radio frequency signal according to an adjusting signal; and
    a first comparator, for receiving the amplitude feedback signal and the target amplitude, and comparing the amplitude feedback signal with the target amplitude, to generate the adjusting signal.

4. The apparatus according to claim 1 wherein the amplitude detecting unit comprises:
    a top peak value detector, for receiving the amplified radio frequency signal, and generating the top envelope signal;
    a bottom peak value detector, for receiving the amplified radio frequency signal, and generating a bottom envelope signal;
    a first subtractor, for subtracting the bottom envelope signal from the top envelope signal, thereby generating the amplitude feedback signal;
    a maximum value detector, for receiving the top envelope signal, and obtaining a maximum value of the top envelope signal;
    a minimum value detector, for receiving the top envelope signal, and obtaining a minimum value of the top envelope signal; and
    a second subtractor, for subtracting the minimum value from the maximum value, thereby outputting the top envelope amplitude.

5. The apparatus according to claim 1 wherein the optical disc is a HTL (High to Low) disc or a LTH (Low to High) disc.

6. A method for judging an optical disc, applied in an optical disc drive, the method comprising steps of:
    receiving a radio frequency signal from an optical pickup head;
    processing the radio frequency signal into an amplified radio frequency signal with a target amplitude;
    obtaining a top envelope signal according to the amplified radio frequency signal, wherein the top envelope signal has a top envelope amplitude;
    determining that the laser beams emitted from the optical pickup head are irradiated on a blank area of the optical disc when the top envelope amplitude is greater than a threshold value; and
    determining that the laser beams emitted from the optical pickup head are irradiated on a data-recorded area of the optical disc when the top envelope amplitude is smaller than the threshold value.

7. The method according to claim 6 wherein the radio frequency signal is processed into the amplified radio frequency signal by a gain controller, wherein the amplified radio frequency signal has the target amplitude.

8. The method according to claim 6 wherein a comparator compares the top envelope amplitude with the threshold value by, thereby judging whether the laser beams emitted from the optical pickup head are irradiated on the blank area or the data-recorded area.

9. The method according to claim 6 wherein the optical disc is a HTL (High to Low) disc.

10. The method according to claim 6 wherein the optical disc is a LTH (Low to High) disc.

* * * * *